Aug. 15, 1950 — C. C. STEVENS — 2,518,833
CLUTCH AND BRAKE MECHANISM
Filed June 14, 1945 — 2 Sheets-Sheet 2
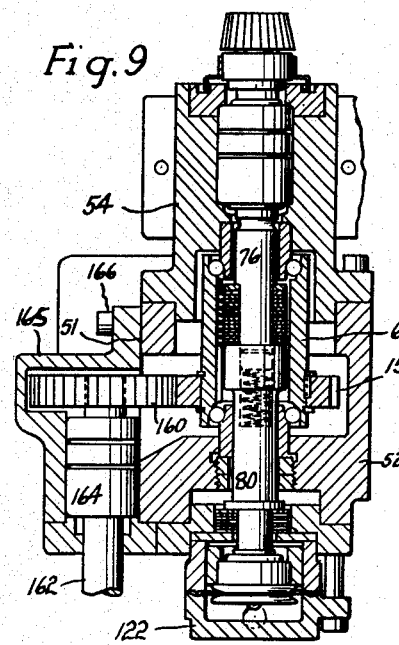
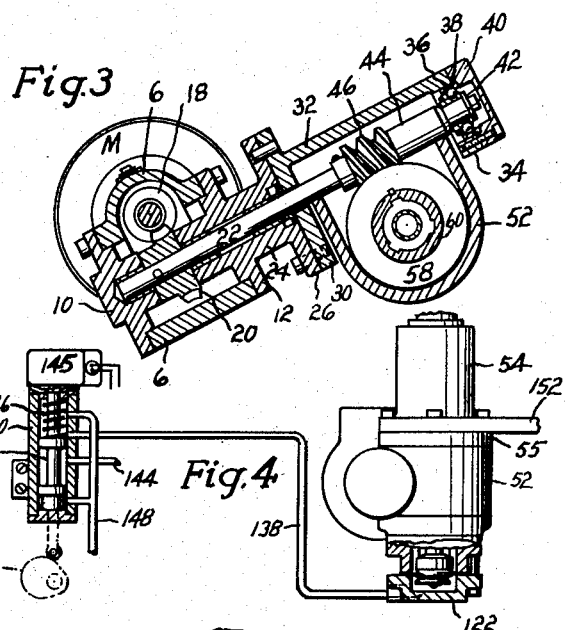
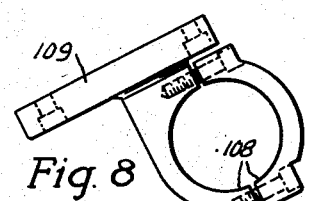
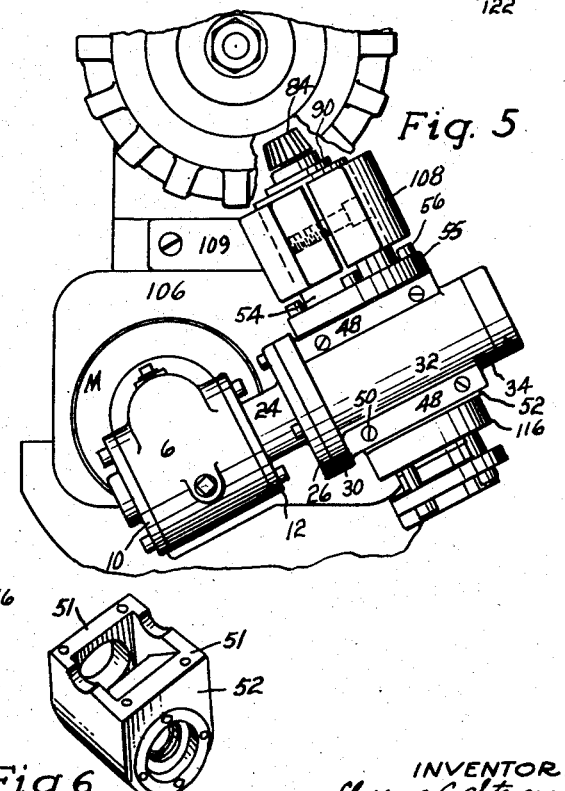
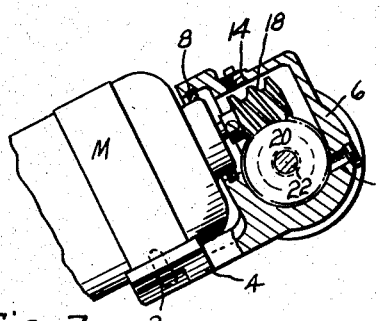
INVENTOR:
Clarence C. Stevens
BY Romeyn A. Spare
HIS ATTORNEY Patented Aug. 15, 1950

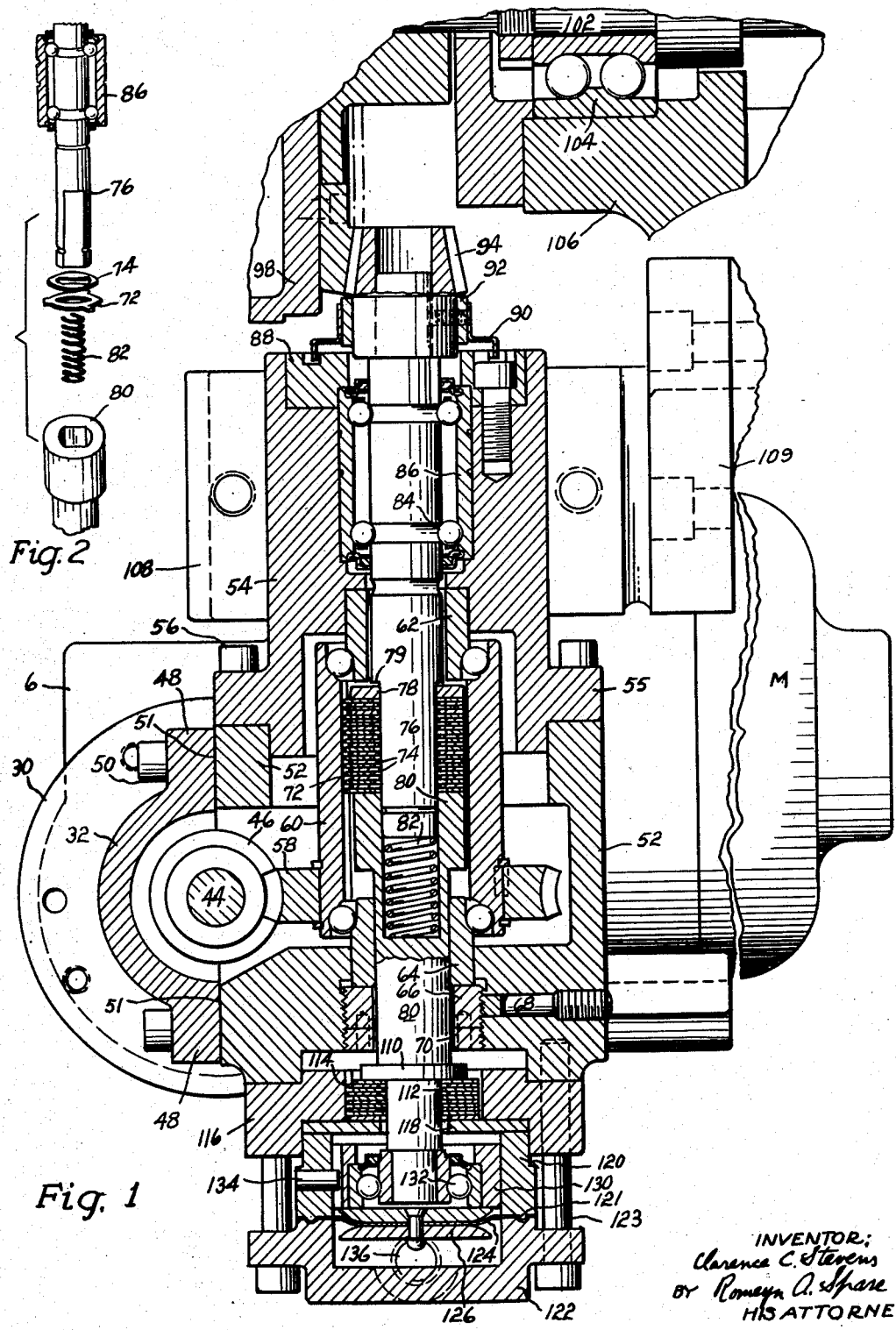

2,518,833

UNITED STATES PATENT OFFICE 2,518,833

CLUTCH AND BRAKE MECHANISM

Clarence C. Stevens, Forestville, Conn., assignor to General Motors Corporation, Detroit, Mich., a corporation of Delaware Application June 14, 1945, Serial No. 599,368

10 Claims. (Cl. 192—18)

This invention relates to clutch and brake mechanism and comprises all of the features and aspects of novelty herein disclosed. An object of the invention is to provide improved mechanism for controlling the rotation and the stopping of a driven shaft. Another object is to provide driving and driven mechanism in units or sections which can be readily connected in various selected positions or as readily detached for servicing. Other objects are to so construct these units and their sections or parts that they can be machined at little expense, will take little space, and will keep the moving parts well housed and protected.

To these ends and also to improve generally upon apparatus of this character, the invention consists in the various matters hereinafter described and claimed. In its broader aspects, the invention is not necessarily limited to the specific constructions selected for illustrative purposes in the accompanying drawings in which:

Fig. 1 is chiefly a central vertical section to larger scale than other views.

Fig. 2 is an exploded perspective view of details.

Fig. 3 is chiefly an axial sectional view of the driving unit.

Fig. 4 is a diagrammatic view in partial section of means to control clutching and braking.

Fig. 5 is a front view of the apparatus.

Fig. 6 is a perspective view of a housing.

Fig. 7 is a sectional view of a motor mounting and the associated gearing of Figs. 3 and 5.

Fig. 8 is a plan view of a clamp.

Fig. 9 is a sectional view of an alternative construction for the driving unit.

A motor M is secured by screws 2 to a bracket 4 on a housing 6 which has a circular recess provided with a seal 8 surrounding a boss on the motor. The housing 6 is closed at one side by a cap 10 and at the other side by a flanged member 12. The housing has a port 14 for supplying lubricant and a port 16 to drain it. The motor shaft carries a worm 18 driving a worm wheel 20 on a shaft 22 which is journalled in bushings in extensions of the members 10 and 12. The member 12 has a connection at 24 with a flange 26 which is removably secured by screws and dowel pins in a selected angular position on an apertured flange 30 which projects from one end of a housing 32, the other end of the housing having a circular portion 34 in which the outer race ring 38 of a sealed ball bearing 36 is clamped by a bolted-on cap 40. The inner race ring of the sealed bearing is secured on the shaft 22 by a washer 42 and a screw. A spacing sleeve 44 is interposed between the inner race ring and a worm 46 which is secured to the shaft. The housing 32 has upwardly and downwardly extending attaching flanges 48 with screw holes, one side of each flange being flat and radial with respect to shaft 44.

The foregoing parts constitute a driving unit which is detachable from certain driven mechanism, screws 50 detachably securing the flanges 48 to flattened faces 51 on a more or less upright housing 52 which supports a driven shaft and other mechanism. The removable driving unit can be readily detached for servicing, for replacement by another unit, or for changing gears. Also due to the angular adjustment at the flanges 26 and 30, the motor shaft can be arranged at various selected angles to the housing 32 depending on considerations of space or convenience.

The housing 52 has an upper detachable section or extension 54 with a flange 55 secured by screws 56. The worm 46 drives a worm wheel 58 keyed to a hub member or sleeve 60 which is journalled by caged balls running on an upper cone 62 secured in a recess of the extension 54 and by caged balls running on a lower cone 64 mounted in an opening of the housing 52. A nut 66 engages the lower cone 64 and serves to shift it axially to put an adjustable preload on the ball bearings. The nut 66 is secured by a plug 68 and a lock nut 70. The sleeve 60 has three internal keyways to engage lugs on a series of outer clutch discs 72 which alternate with inner clutch discs 74 which are keyed to a driven shaft 76, the keying to the shaft being effected by flattening a portion of the shaft for insertion in waisted or elongated slots in the inner discs. The uppermost disc engages a thick washer 78 adapted to abut against a shoulder 79 on the shaft while the lower disc can be lifted at will by the upper end of a shiftable shaft or clutch actuator 80 whenever the latter is lifted against the tension of a coil spring 82 housed in the actuator and engaging the lower end of the shaft 76. An upward movement of the actuator squeezes the discs together to clutch the sleeve 60 to the shaft 76 but the spring 82 releases and unclutches these members when the upward pressure is removed. As will later appear the spring also applies a brake to the actuator which is keyed to the shaft 76, the interior of the actuator being flat-sided like the shaft to effect such keying.

The driven shaft 76 has grooved raceways for two rows of ball bearings 84 engaging raceways in an outer raceway sleeve 86 which is clamped in a bore of the housing extension 54 by a ring 88 fastened in a counterbore by screws. The ring has a circular groove receiving a circular flange on a shield or skirt 90 which is secured to a sleeve 92 on the hub of a bevel pinion 94 which drives a bevel gear on a housing 98. The housing 98 is herein indicated as a part of a feed mechanism suitably connected as by planetary gear reduction to a feed screw shaft 102 journalled in a ball bearing 104 in a grinding machine frame 106. A sectional clamp 108 (Fig. 8) secures the housing extension 54 to a bracket 109 which is bolted to the frame, the extension 54 being angularly adjustable around its axis. The mechanism driven by the shaft 76 may take various forms and the driven feed mechanism is merely illustrative of one use.

The lower portion of the shaft or actuator 80 has a shoulder engaged by a washer 110 which abuts against the uppermost of a series of slotted inner brake discs 112 which are keyed by the slots to a flat portion of the actuator and alternate with outer brake discs 114 having lugs engaging keyways in a ring 116 detachably fastened to the housing 52. In other words the brake discs are similar to the clutch discs of Fig. 2. The lowermost brake disc engages a brake washer 118 clamped in a recess of the ring 116 by a sleeve 120. The lower edge of the sleeve has a circular rib 121 mating with a groove in a cap 122, the ring 116, washer 118, sleeve 120 and cap 122 being removably secured by bolts 123 to the housing 52. The peripheral portion of a flexible diaphragm 124 is clamped between the sleeve and the cap while the central portion of the diaphragm is clamped between movable washers 126. These washers are rounded off near the periphery so as not to cut the diaphragm and their centers are riveted together. The uppermost washer engages the lower end of a flanged sleeve or bearing housing 130 in which the outer race ring of a shielded ball bearing 132 is seated, the inner race ring being seated on the lower end of the shaft or actuator 80 against a shoulder thereof. The sleeve 130 which can slide vertically a short distance is keyed from rotation by a pin 134. A port 136 in the cap 122 supplies fluid pressure to the lower side of the diaphragm to lift the mechanism supported thereby.

Upward movement of the diaphragm exerts an upward thrust through the ball bearing 132 to the shaft or actuator 80 which becomes free to rotate and can always slide in the cone 64; the clutch discs 72 and 74 are thus squeezed together to clutch the driving sleeve 60 to the driven shaft 76. The brake discs 112 and 114 are simultaneously relieved of pressure and the actuator and the driven shaft are free to turn. Upon release of the fluid pressure, the coil spring 82 pushes the actuator down against the brake discs and stops rotation of the actuator and the driven shaft which is keyed to it.

One means to actuate the diaphragm 124 is indicated in Fig. 4, the cap 122 being connected by a pipe 138 to a valve casing 140 containing a piston rod 142 having spaced pistons. Pressure fluid, as from a pump, can be introduced between the pistons from a pipe 144 and can be directed into the pipe 138 when the piston rod is raised as by a solenoid 145 acting against the pressure of a spring 146. In the position indicated pressure in the pipe 138 is relieved by the exhaust pipe 148 and the brake will be on. This is the desirable condition at periods when work and grinding wheel are reversing their direction of relative movement as in an oscillating grinder. Feeding impulses for a step feed will occur under the diaphragm whenever the solenoid is energized. The feed will be continuous if the solenoid is kept energized and rate of feed can be increased or decreased by a rheostat controlling the motor. As an alternative, the piston rod may be actuated upwardly against the spring by a cam 150 as indicated in broken lines, the cam having dwells as desired and being oscillated or rotated.

Fig. 4 also illustrates an alternative way of supporting the housing 52, its flange 55 being bolted in selected angular position to a ring-shaped bracket 152 on the machine frame. When an unbroken cylindrical bore is available, the extension housing 54 can be piloted therein.

Fig. 9 illustrates an alternative way to drive the hub member 60 by a shaft parallel to its axis. A gear 158 meshes with a gear 160 on a driving shaft 162 journalled in a raceway sleeve 164 in a housing 165 which is detachably secured by screws 166 against the flat faces 51 of the housing section 52. Gear ratios may be quickly changed since the gear 158 (or the gear 58 of Fig. 1) may be diametrically split for removal or clamping on the hub member. A filler plate may be interposed between the flat faces 51 and the flat faces on the driving shaft housing to procure proper meshing.

By releasing the clamp 108 of Figs. 1 and 8 which provides for angular adjustment, the entire driving and driven mechanisms can be removed as a unit from the machine. The driving mechanism is removable as a unit from the driven mechanism and is itself formed in separable and angularly adjustable sections. Removal of the screws 56 frees the housing section 52 and the enclosed parts from the extension housing 54 and the driven shaft. Removal of the lower bolts 123 frees many parts while removal of the top ring 88 frees the driven shaft and its bearing from the housing section 54. Thus the mechanism is easily serviced in any of its various units or parts. Most parts are cylindrical or circular so that manufacture is economical. Moving parts are completely housed and well compacted.

I claim:

1. In apparatus of the character indicated, a housing having a bore provided with a plurality of bearings, a driving sleeve journalled for rotation around one of the bearings, a driven shaft journalled for rotation in another of the bearings and entering one end of the sleeve, clutch mechanism between the sleeve and the shaft, a clutch actuator entering the other end of the sleeve and journalled for rotation in another of the bearings, the shaft and the clutch actuator terminating within the driving sleeve, and means for shifting the actuator axially of the shaft to operate the clutch.

2. In apparatus of the character indicated, a housing, a driving sleeve journalled for rotation in the housing, a driven shaft journalled for rotation in the housing and entering one end of the sleeve, clutch mechanism between the sleeve and the shaft, a clutch actuator entering the other end of the sleeve, a spring interposed between the actuator and the shaft to disengage the clutch, and means for shifting the actuator against the spring to clutch the shaft to the sleeve.

3. In apparatus of the character indicated, a housing, a driving sleeve journalled for rotation in the housing, a driven shaft journalled for rotation in the housing and entering one end of the sleeve, clutch mechanism between the sleeve and the shaft, a clutch actuator keyed to the shaft and entering the other end of the sleeve, brake mechanism between the actuator and the housing, a spring interposed between the actuator and the shaft to disengage the clutch and apply the brake, and means for shifting the actuator against the spring to release the brake and clutch the shaft to the sleeve.

4. In apparatus of the character indicated, a sleeve, a shaft, a clutch actuator, all journalled for rotation around a common axis, the shaft extending into a recess of the actuator, clutch mechanism between the sleeve and the shaft adjacent to the actuator, means for shifting the actuator axially of the shaft to operate the clutch, and a spring inserted in the recess of the actuator and engaging the end of the shaft to release the clutch.

5. In apparatus of the character indicated, a housing having a bore provided with a plurality of bearings, a driving sleeve revolving around one of the bearings, a driven shaft journalled for rotation in another of the bearings, clutch mechanism between the driving sleeve and the shaft, a clutch actuator journalled for rotation by another of the bearings, a diaphragm extending across the actuator, the driving sleeve, driven shaft, clutch mechanism and clutch actuator all being contained within the housing and means for flexing the diaphragm to axially shift the actuator and operate the clutch.

6. In apparatus of the character indicated, a housing, a clutch and a brake, a clutch and brake actuator shiftable in the housing, an antifriction bearing on the actuator and having an outer race ring, said outer race ring being mounted for axial sliding movement in the housing, a diaphragm extending across the race ring, and fluid pressure means for flexing the diaphragm to shift the bearing and the actuator axially to control actuation of the clutch and brake.

7. In apparatus of the character indicated, a fixed supporting housing, a driven shaft journalled for rotation in the housing and substantially entirely enclosed by the housing, an actuator keyed to the shaft and enclosed within the housing, a bearing between the housing and the actuator to support the actuator for rotation, brake mechanism interposed between the actuator and the housing, and means for shifting the actuator axially of the shaft to apply or release the brake.

8. In apparatus of the character indicated, a fixed supporting housing, a driven shaft journalled for rotation in the housing, an actuator keyed to the shaft and shiftable axially thereof, a bearing slidable axially in the housing and supporting the actuator for rotation with the shaft, the actuator, the bearing and substantially all of the shaft being enclosed by the housing and receiving support therefrom brake mechanism interposed between the actuator and the housing, a spring for shifting the actuator in one direction to apply the brake, and means for shifting the bearing and the actuator in the opposite direction to release the brake.

9. In apparatus of the character indicated, a housing, a driving sleeve journalled for rotation in said housing, a driven shaft journalled for rotation in the housing and entering one end of the sleeve, clutch mechanism between the sleeve and the shaft, a clutch actuator keyed to the shaft for rotation therewith, brake mechanism interposed between the actuator and the housing, a spring for shifting the actuator in one direction to apply the brake, and means for shifting the actuator in the opposite direction to actuate the clutch, said shifting means having a bearing interposed between it and the actuator to provide for their relative rotation.

10. In apparatus of the character indicated, a driving unit comprising a pair of detachably connected housings, a shaft journalled in one housing and extending into the other, a second shaft journalled in the other housing and extending crosswise of the first shaft, gearing connecting the shafts, the housings having flanges surrounding the first shaft and engaging one another in a plane perpendicular to the first shaft to provide for the turning of one housing with respect to the other around the first shaft as an axis, and means for securing the flanges together in selected angular positions.

CLARENCE C. STEVENS.

REFERENCES CITED

The following references are of record in the file of this patent:

UNITED STATES PATENTS

| Number | Name | Date |
|---|---|---|
| 1,033,257 | Mascord | July 23, 1912 |
| 1,167,012 | Neuteboom | Jan. 4, 1916 |
| 1,167,865 | White | Jan. 11, 1916 |
| 1,268,334 | Everett | June 4, 1918 |
| 1,528,973 | Groene | Mar. 10, 1925 |
| 1,759,755 | Linder | May 20, 1930 |
| 2,069,016 | Newton | Jan. 26, 1937 |
| 2,081,239 | Klopfenstein | May 25, 1937 |
| 2,172,788 | Christensen | Sept. 12, 1939 |
| 2,354,604 | Newell | July 25, 1944 |
| 2,354,854 | Doll | Aug. 1, 1944 |
| 2,370,360 | McLean | Feb. 27, 1945 |
| 2,377,575 | Ringer | June 5, 1945 |
| 2,383,103 | Abel | Aug. 21, 1945 |
| 2,384,346 | Schnell | Sept. 4, 1945 |
| 2,387,418 | Sundt | Oct. 23, 1945 |
| 2,405,642 | Corte | Aug. 13, 1946 |